June 3, 1952 W. G. STEWART 2,599,138
MODEL ELECTRIC LOCOMOTIVE
Filed Jan. 16, 1947 7 Sheets-Sheet 3

INVENTOR
Willis G. Stewart
BY
Kenyon & Kenyon
ATTORNEYS

June 3, 1952  W. G. STEWART  2,599,138
MODEL ELECTRIC LOCOMOTIVE

Filed Jan. 16, 1947  7 Sheets-Sheet 4

INVENTOR
Willis G. Stewart
BY
Kenyon & Kenyon
ATTORNEYS

June 3, 1952 W. G. STEWART 2,599,138
MODEL ELECTRIC LOCOMOTIVE
Filed Jan. 16, 1947 7 Sheets-Sheet 6

June 3, 1952  W. G. STEWART  2,599,138
MODEL ELECTRIC LOCOMOTIVE
Filed Jan. 16, 1947  7 Sheets-Sheet 7

INVENTOR.
Willis G. Stewart
BY
Kenyon & Kenyon
ATTORNEYS

Patented June 3, 1952

2,599,138

UNITED STATES PATENT OFFICE 2,599,138

MODEL ELECTRIC LOCOMOTIVE

Willis G. Stewart, Portsmouth, R. I., assignor to Midgage Models, Inc., Portsmouth, R. I., a corporation of Rhode Island Application January 16, 1947, Serial No. 722,431

9 Claims. (Cl. 105—49)

This invention relates to scale model railway trains and more particularly, to a method of construction and assembling of all parts of a scale model railway passenger train with the exception of the trucks. The trucks to be used with the passenger cars on this train are described in my copending application, Serial No. 699,400, now U. S. Patent No. 2,522,317, dated Sept. 12, 1950.

One object of my invention is to provide an extruded car section that may be used as the basic section of either a streamlined passenger car, or a streamlined freight or passenger train locomotive or as the basic section of an observation car.

Another object of my invention is to provide a basic car section with the various modifications mentioned above that is faithful to prototype.

Another object of my invention is to provide a method of connection between streamlined passenger cars that is faithful to prototype. This is achieved by using a molded rubber diaphragm fitted to the vestibule section of each passenger car.

A further object of my invention is to provide an extruded basic car section having internal fittings which allow for the insertion of a floor board and also for the insertion on each side thereof of continuous strips of transparent material which will act as windows for the passenger car. By using the continuous strips of transparent material bulging at the windows is prevented and a high degree of faithful adherence to the appearance of prototype is achieved. In addition, by extruding the car section the external appearance of prototype, namely the corrugated side, is also achieved.

A further object of my invention is to provide an electric engine that is capable of picking up power from double polarized track without fear of short circuit. This engine is so constructed that its driving wheels are allowed freedom of vertical movement without causing the driving gears to get out of mesh.

A further object of my invention is to provide a novel method of suspension of this motor in the forward part of the locomotive cab.

Other objects and features of my invention will make themselves apparent during the course of the following description when taken with the accompanying drawings in which.

Similar parts and similar figures have been identically numbered.

At the outset it should be noted that the truck shown in Figs. 1, 2, 4, 14 and 15 is described in my copending application, Serial No. 699,400, now U. S. Patent No. 2,522,317, dated Sept. 12, 1950.

Figure 1:
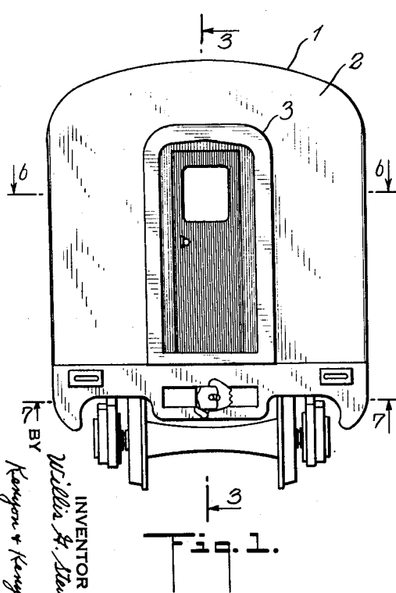
Fig. 1 is an end view of a completed passenger car.
Figure 2:
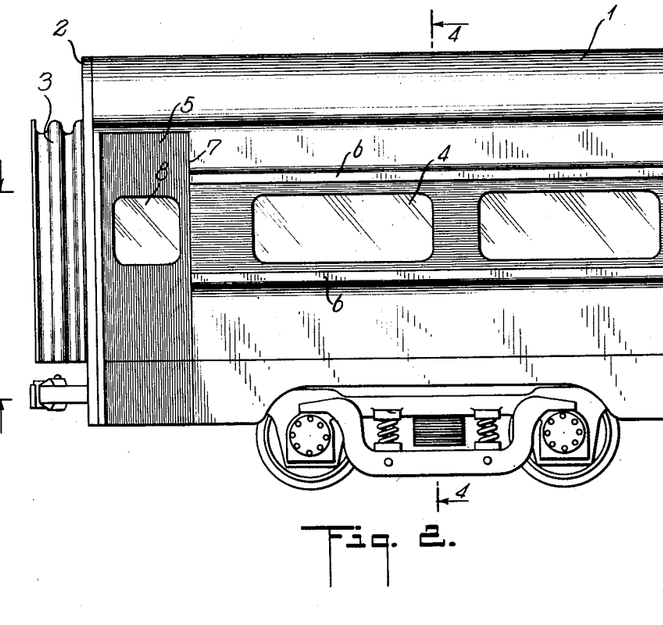
Fig. 2 is a side elevation of a passenger car with the diaphragm attached.

Referring now to the drawings, and particularly to Figures 1 and 2 in which the completed passenger car is shown, 1 indicates the extruded car body section, 2 indicates the vestibule section in place and 3 indicates the rubber diaphragm attached to the vestibule section 2. In Fig. 2 are shown the windows 4 and the door 5. The projections 6, running the length of the car, are machined off at the door 5 and a line 7 is machined into the car side to give the illusion of a door as is the outline of the window 8 in the door 5. The outline of the windows 4 is stamped out of the extruded car bodies section.

Figure 8:
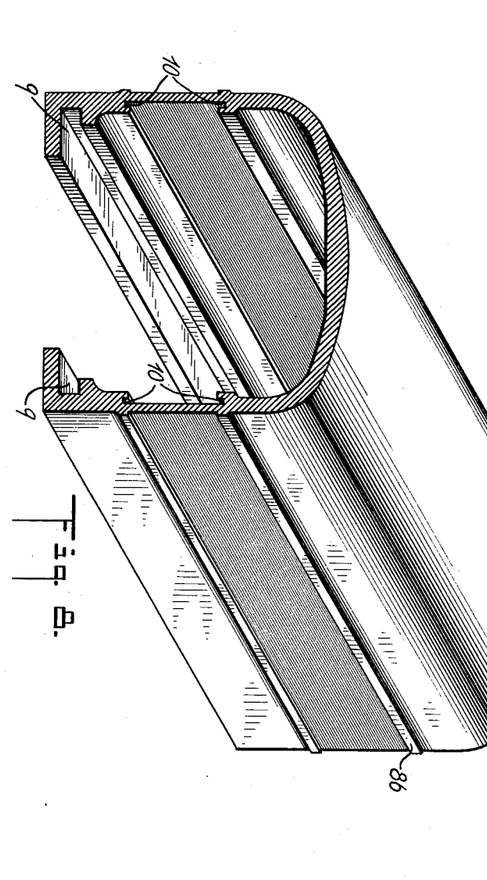
Fig. 8 is a section of an extruded car body in perspective.

Referring now to Fig. 8 in which the internal structure of the extruded car body section is shown, 9 indicates the slots formed by longitudinally extending ribs in which the wooden floor board is to be inserted and 10 indicates the slots formed by longitudinally extending ribs for the reception of the continuous strip of transparent material.

Figure 3:
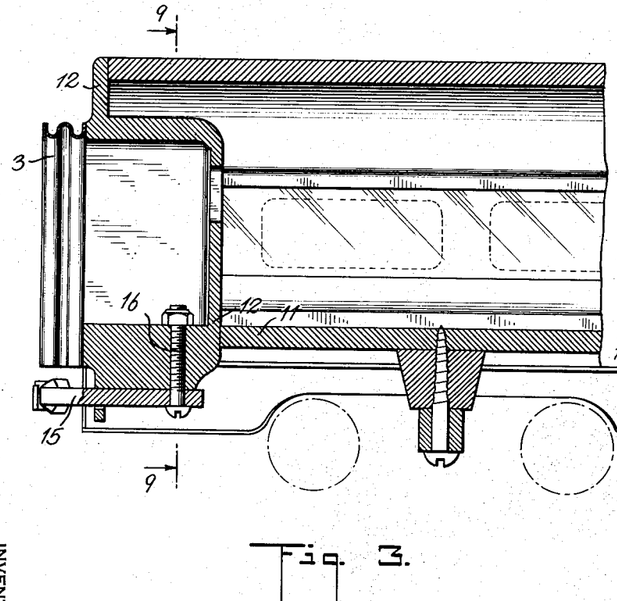
Fig. 3 is a cross sectional view taken on line 3—3 in Fig. 1.
Figure 6:
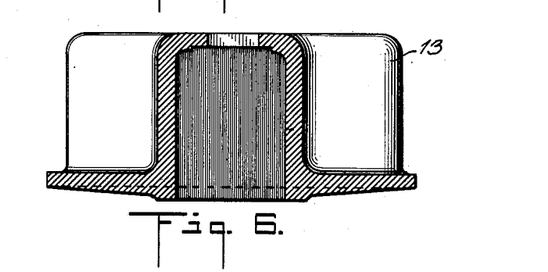
Fig. 6 is a cross sectional view taken on line 6—6 in Fig. 1.
Figure 7:
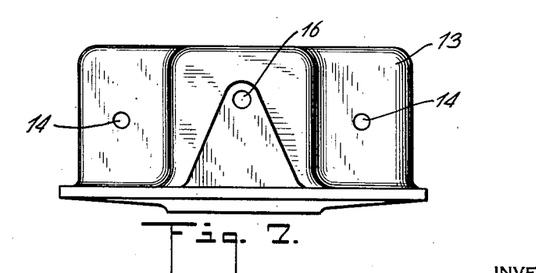
Fig. 7 is a cross sectional view taken on line 7—7 in Fig. 1.
Figure 9:
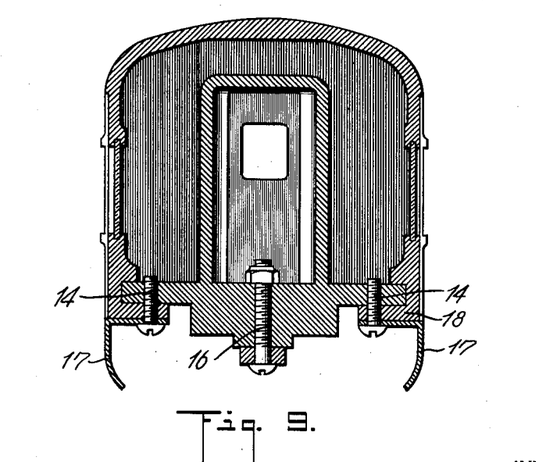
Fig. 9 is a cross sectional view taken on line 9—9 in Fig. 3.

Referring now to Fig. 3, 11 indicates the floor board which abuts on the end of the cast vestibule section 12. It is to be noted that the floor board does not run the complete length of the passenger car. The vestibule section 12 has wings 13 as shown in Figs. 6 and 7 for insertion into the slots 9. The vestibule section 12 is a metal casting, and, referring to Fig. 9, is held in place in the slots 9 by metal screws 14. The coupler 15 is held in place by the nut and bolt assembly 16 shown in Figs. 3 and 9 and the rubber diaphragm 3 is glued to the vestibule section 12. The position of the metal retaining screws 14 is shown in Fig. 7, as is the position of the nut and bolt assembly 16.

Figure 4:
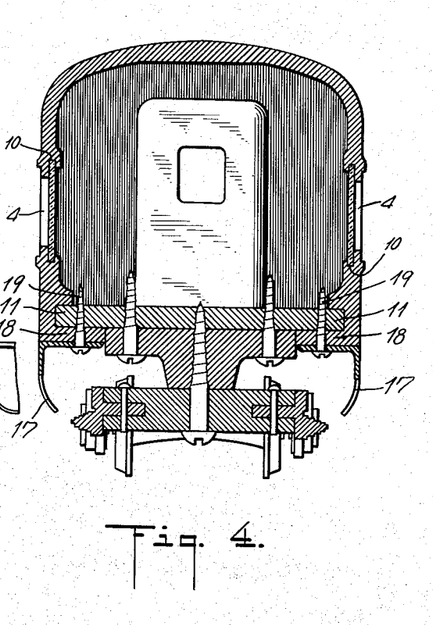
Fig. 4 is a cross sectional view taken on line 4—4 in Fig. 2.
Figure 5:
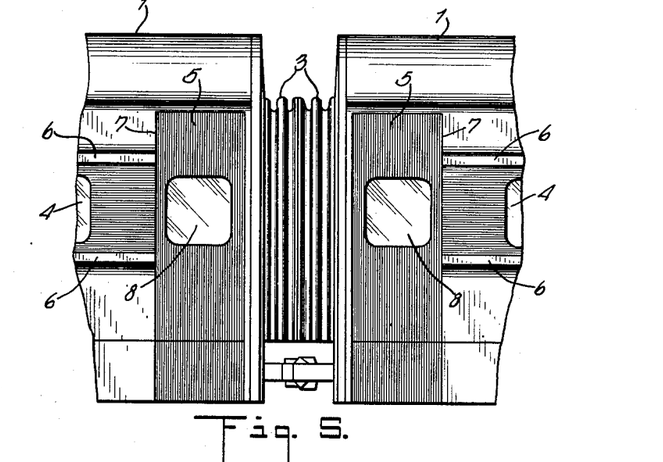
Fig. 5 is a side elevation showing two cars and their method of connection.

Referring now to Fig. 4, 17 indicates the fairings which are attached to the side bases 18 of the extruded car body section by means of wood screws 19 which pass through, and retain in place, the floor board 11. The fairings may also be extruded with the car section as an integral part of it. The truck recesses shown in Fig. 15 would then have to be machined out.

Referring now to Fig. 9 the metal screws 14 also pass through the fairing 17 and the base 18 of the extruded car body section.

Referring now to Figs. 10, 11 and 13, 20 indicates a lug cast integrally with the locomotive head which is positioned in the extruded car section that makes up the rest of the locomotive and metal screw 21 is counter-sunk through the top of the extruded car body section and the lug 20. Two additional lugs 22 and 23 are inserted in slots 9 of the extruded car body section and retained in position by metal screws 24 and 25.

Figures 10, 11, 12, 13:
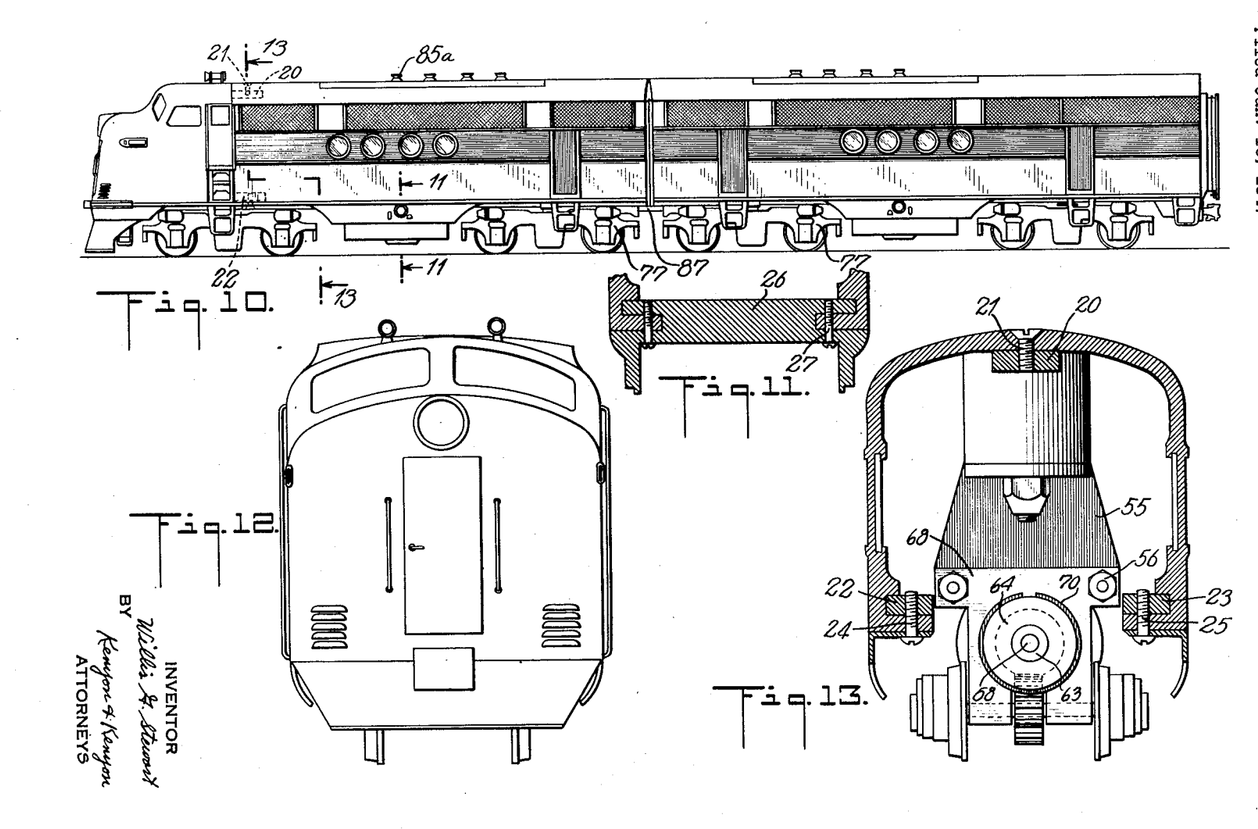
Fig. 10 is a side elevation of a freight car locomotive employing the extruded car body section.
Fig. 11 is a cross sectional view taken on line 11—11 in Fig. 10.
Fig. 12 is a front elevation of the locomotive head shown in Fig. 10.
Fig. 13 is a cross sectional view taken substantially on line 13—13 in Fig. 10.

Fig. 11 shows the method of attaching the oil tank to the underside of the extruded car body section when used as part of a locomotive. A cast section 26 is placed in the slots 9 of the extruded car body section prior to the attachment of the locomotive head and positioned with its center at line 11—11 in Fig. 10. Metal screws 27 are then inserted retaining the cast section in place. The cast section 26 is so cast that its exterior is a faithful reproduction of an oil tank on its larger brother.

Figure 14:
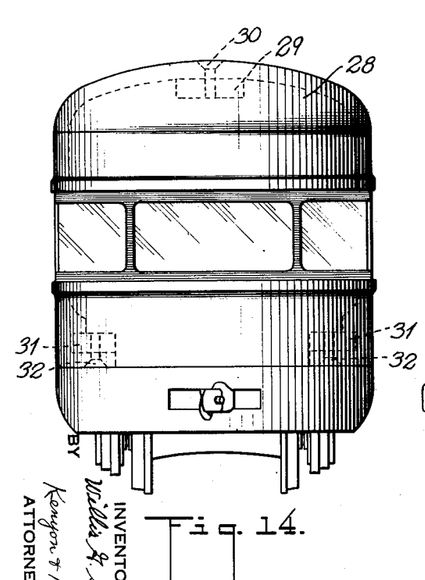
Fig. 14 is an end view of an observation rear car section.
Figure 15:
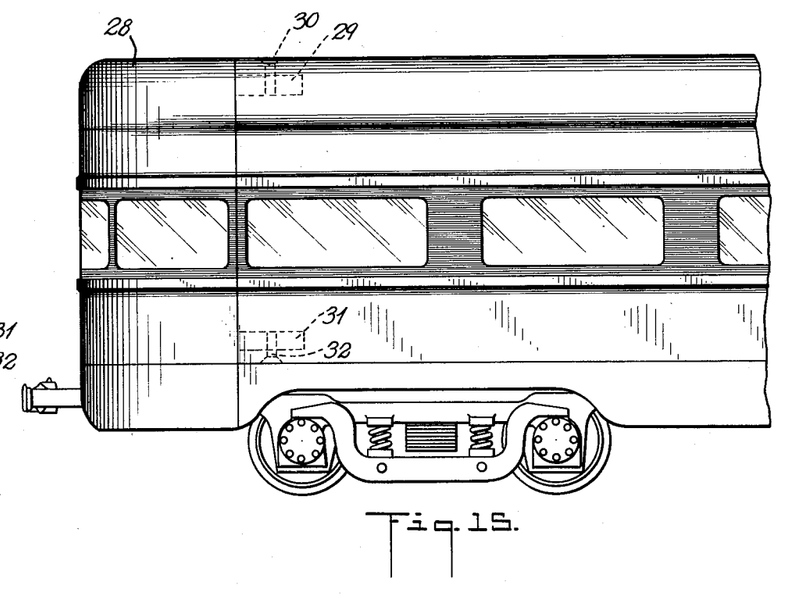
Fig. 15 is a side view of the basic car section with the observation car section attached.

Figs. 14 and 15 illustrate a similar method of attaching an observation car rear section 28 to an extruded car body section. The lug 29, cast integrally with the observation car section, is positioned at the roof in the extruded car body section and a metal screw 30 is counter-sunk in the roof of the extruded car body section. Two additional projecting lugs 31, corresponding to and fitting in the internal slots 9 of the extruded car body section are cast integrally with the observation car section and these lugs after insertion into the slots 9 are retained in position by metal screws 32.

It is to be noted in attaching the various sections to the extruded car body section that the interior of the roof of the extruded car body section is flat as shown in Fig. 13 while the exterior of the roof is rounded giving the car a high degree of faithfulness to prototype.

Figure 16:
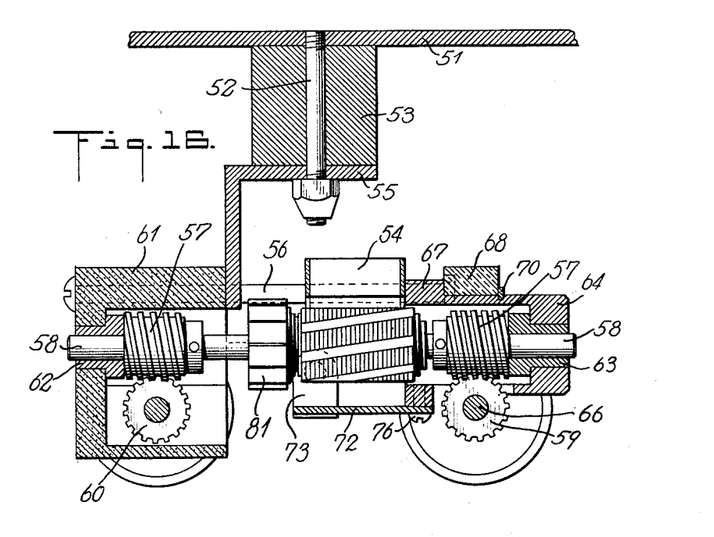
Fig. 16 is a cross sectional view of the electric motor.

Referring now to Fig. 16, 51 indicates the roof of the locomotive section. The electric motor 54 is retained in position by an inverted L-shaped member 55 through which passes the locknut 52 and which is attached to the electric motor 54 by passing the longitudinal spacers 56 through prepared holes in the vertical leg of the inverted L-shaped member 55. A spacer 53 having a prepared aperture for the insertion of the locknut 52 is positioned between the inverted L-shaped member 55 and the roof 51. As shown in Fig. 13 the L-shaped member is flared downwardly so that both longitudinal spacers are able to pass through the opposite base extremities of the vertical leg of the inverted L-shaped member 55.

Figure 17:
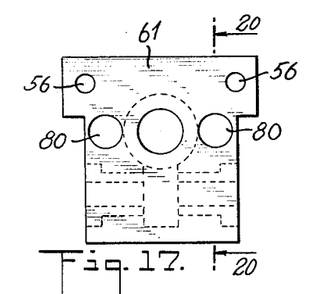
Fig. 17 is an end view of a detail in Fig. 16.
Figure 18:
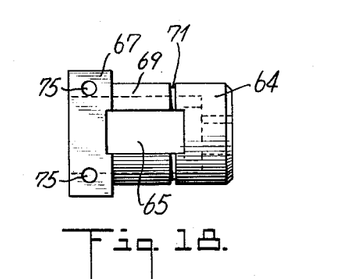
Fig. 18 is a bottom view of a detail in Fig. 16.

The electric motor is of the conventional type having a worm gear system of transmitting power to the wheels. The gears 57 are attached to the rotor 58 at each extremity thereof and are meshed with the driving gears 59 and 60. The forward gearing system is enclosed in a hollow block 61 of dielectric material which is retained in attachment and alignment with the rotor shaft by means of the longitudinal spacers 56 positioned as shown in Fig. 17. The opposite extremities of the rotor shaft 58 are positioned in an oil lube bearing 62 set in the dielectric block 61 and a similar oil lube bearing 63 set in the hollowed-out brass frame 64 which contains the gear system located at the rear of the motor. Fig. 18 shows a bottom plan view of this hollowed-out brass frame with an aperture 65 for the driving gear which is attached to the middle of the axle 66. The longitudinal spacers 56 retain the brass frame 64 and the dielectric block 61 in attachment and alignment with the rest of the motor by passing through the block 61, the field laminations (not shown) and thence through the first shoulders 67 of the brass frame 64. A collar of dielectric material 68 is shown positioned over the middle section 69 of the brass frame 64 and is retained in lateral position by a snap ring 70 fitting in grooves 71 of the brass frame 64. The dielectric block 68 extends down both sides of the brass frame and has positioned in its base extremities the axle 66 to which is attached the wheels. By using this method of construction and assembly, the block 68 and the wheel and axle assembly with its driving gear 59 attached can rotate, to the extent allowed by the aperture 65 in the bottom of the brass frame 64, around the gear 57 positioned on the rotor shaft. The driving gear will remain in mesh with the gear attached to the rotor shaft at all times. This allows the engine to run at high speeds over rough track without fear of derailment.

Figure 19:
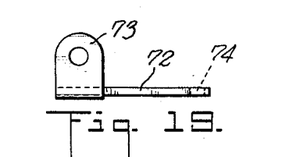
Fig. 19 shows a welded plate and suspension hook that fits the bottom of the motor shown in Fig. 16.

To prevent the motor 54 from picking up any metallic objects that may be lying on the track bed, a plate 72 as shown in Fig. 19 is welded to a carrying brace 73 as shown in Fig. 19. The plate 72 has prepared screw holes 74 corresponding to screw recesses in the brass frame 64 and located on the underside thereof, indicated at 75. Metal screws 76 are used to attach and align the plate 72 to the underside of the electric motor 54. In this manner the magnetic field created by the operation of the motor is effectively confined within the underside of the motor 54 and the top side of the plate 72.

The carrying brace 73 is used for the attachment of cast sections simulating the journal boxes and springs of the locomotive driving wheels and is shown in Fig. 10 at 77. These cast sections 77 are attached to the carrying brace 73 by means of ordinary rivets.

Figure 20:
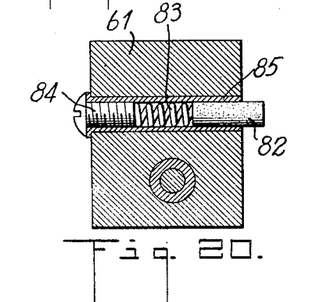
Fig. 20 shows a cross sectional view taken on line 20—20 in Fig. 17.

Fig. 17 is an end view of the dielectric block 61 and indicates the positioning of the longitudinal spacers 56 and the brushes 82 which bear on the commutator 81. Fig. 20 shows a cross-sectional view of the method of keeping the brush in contact with the commutator 81. The brush 82 is forced outward by the compressed spring 83 which is retained under compression by the screw 84, all of which is contained in a copper sleeve 85.

The electric motor 54 is designed to run on double polarized track and as a consequence one wheel on each driving axle is insulated, each wheel insulated being opposite to each other. This is achieved by pressing on to the metal axle a sectional band of dielectric material (not shown). The circuit is completed by the two uninsulated wheels, one positive, the other negative, the current being taken from one wheel to the brushes through the motor and thence to the other or negatively charged wheel. The motor is of the conventional type having its field winding located above the armature and field laminations extending downward from the field winding to the underside of the stator.

As shown in Fig. 13 the engine is attached to the cast locomotive cab section just forward of the cab section's point of attachment to the extruded car body section.

All of the fittings and apertures shown in Fig. 10 will be stamped in the extruded car body section and the exhausts 85A will be retained in position by metal screws. The beading 86, shown in Fig. 8, will be machined off in all places where necessary and door outlines will be inscribed on the metal itself.

Inasmuch as the locomotive will come in two sections, it will be necessary to place a vestibule cast section in the rear of the forward locomotive section and in the front of the rear locomotive section. A sectional brass bar 87 will be attached to the coupler holder 16 as shown in Fig. 9. Enough leeway will be left between the front and rear sections of the locomotive to allow it to negotiate curved track.

These units will be manufactured and sold to the public as kits and will be assembled by the user. By use of the various cast sections and electric motor in connection with the extruded car body, a comparatively simple method of assembling has been provided as well as an exceptionally high degree of faithfulness to prototype.

I claim:

1. A scale model railway train, having in combination, one or more passenger cars each comprising an extruded car body section having internal slots at the base of each side thereof for reception of a floor board and internal longitudinal shelves having opposed grooves therein on each side of said extruded car body section for reception of continuous strips of transparent material in planes parallel to and adjacent the said sides, fairings running the length of each side of the extruded car body section and attached to the base of said extruded car body section by screw means, cast vestibule sections inserted at each end of said extruded car body section, said cast vestibule section having wings for insertion into said internal slots of said extruded car body section and said vestibule cast section being retained in position by screw means passing through said fairings and said slots and said wings of said vestibule cast section, a molded rubber diaphragm glued to the outer extremities of said vestibule cast sections to simulate a passageway between said scale model railway train passenger cars, and a locomotive comprising said extruded car body section attached to the frontal section of a streamlined locomotive and an observation car comprising said extruded car body attached to a simulation of the rear section of an observation car, said locomotive and observation car sections having cast integrally with them projecting lugs for insertion into the prepared recesses of said extruded car body section and retained therein by screw means, all of said cars and said locomotive being detachably coupled together to form said train.

2. In a scale model railway train an electric motor for use on double polarized track having a drive shaft and a worm gear system at each extremity of said drive shaft for transmission of power to the driving axles, said forward worm gear system being encased in a hollowed out block of dielectric material through the base extremities of which pass the axle, said block having positioned in it a bearing for holding and aligning the forward end of said drive shaft, and said block being retained in position and alignment with the motor by longitudinal spacers passing through the opposite sides of said block and thence through the field laminations of said motor; a rear worm gear system encased in a hollow metal frame, said frame being retained in position and alignment by said longitudinal spacers, said frame having in rotating alignment with it a collar of dielectric material, a rear driving axle positioned in the opposite base extremities of said collar, said collar being retained in position by a snap ring positioned in a groove in said frame, and said collar with axle and wheel assembly attached being capable of rotative movement around the drive shaft, said rotative movement being limited to the width of an opening on the underside of said frame through which emerges the driving gear if said rear worm gear system.

3. A scale model streamlined railroad rolling stock body comprising, in combination, an extruded metal channel section having an exterior formed to reproduce the general contour of the sides and top of a full size streamlined railroad rolling stock body and having an interior formed to provide mutually opposed longitudinally extending inwardly projecting ribs along the bottom portions of the section's sides, and having longitudinally extending panel portions in said sides and in which openings are formed to reproduce the side openings of said full size body, and body-finishing end assemblies externally reproducing the general contour of the end assemblies of said full size body and adapted to fit the ends of said section and having inwardly projecting wings adapted to be slid along said ribs during installation of said assemblies to said section, whereby said wings and said ribs cooperate in positioning said end assemblies.

4. A body as defined by claim 3 with the section defined by said claim having its interior further formed to provide second ribs adjacently spaced from each of the ribs defined by said claim and defining slots, the wings defined by said claim being adapted to slide into said slots.

5. A body as defined by claim 3 with the there defined section having its interior further formed to provide a pair of longitudinally extending vertically spaced ribs on each interior side above the ribs defined by said claim and straddling the there said exterior panel portions and openings, the ribs of said pairs in each instance being formed to define vertically opposed slots and with strips of opening-closing material adapted for sliding reception by said slots provided by said rib pairs, the end assemblies defined by said claim being adapted to close the ends of said slots of said rib pairs when applied to said section.

6. A body as defined by claim 3 with at least one of the there said end assemblies provided near its top with an inwardly projecting lug adapted to engage beneath the bottom of the top web of the there said extruded section.

7. A scale model railroad rolling stock assembly comprising a channel section inverted to form a car body, a truck and a column extending upwardly from said truck inside said channel and pivotally connecting with the bottom or inside of the top web of said channel to carry the latter, said truck being powered by a combination including axles with pinions fixed thereto, a solid continuous electric motor armature shaft extending transversely over said axles and having worm gears meshed with said pinions, a hollow form embracing one of said worm gears and the one of said pinions meshing therewith and solidly journaling the adjacent end of said shaft and the one of said axles adjacent thereto, a second hollow form embracing the second one of said worm gears and pinions but journaling only the relatively adjacent end of said shaft and having a cylindrical outside surface substantially concentric to the second worm gear, means for rigidly interconnecting said forms, and a collar member having a cylindrical surface riding on said cylindrical surface of said second form and journaling this second one of said axles.

8. A scale model railroad rolling stock power truck including the combination of axles with pinions fixed thereto, a solid continuous electric motor armature shaft extending transversely over said axles and having worm gears meshed with said pinions, a hollow form embracing one of said worm gears and the one of said pinions meshing therewith and solidly journaling the adjacent end of said shaft and the one of said axles adjacent thereto, a second hollow form embracing the second one of said worm gears and pinions but journaling only the relatively adjacent end of said shaft and having a cylindrical outside surface substantially concentric to the second worm gear, means for rigidly interconnecting said forms, and a collar member having a cylindrical surface riding on said cylindrical surface of said second form and journaling this second one of said axles.

9. A scale model streamlined railroad rolling stock body comprising an extended metal channel section having an exterior formed to reproduce the general contour of the sides and top of a full size streamlined railroad rolling stock body and having an interior formed to provide mutually opposed longitudinally extending inwardly projecting ribs along the bottom portions of the section's sides, and having longitudinally extending panel portions in said sides and in which openings are formed to reproduce the side openings of said full size body, and the sides and top of said section extending straight and said sides being mutually parallel from end to end of said section and said section having an open end through which a floor strip may be slid longitudinally on said ribs horizontally between the sides of said section.

WILLIS G. STEWART.

REFERENCES CITED

The following references are of record in the file of this patent:

UNITED STATES PATENTS

| Number | Name | Date |
|---|---|---|
| 901,921 | Markman | Oct. 20, 1908 |
| 1,236,149 | Coventry | Aug. 7, 1917 |
| 1,845,201 | Shepard | Feb. 16, 1932 |
| 1,891,740 | Westerman | Dec. 20, 1932 |
| 2,019,690 | McKeige | Nov. 5, 1935 |
| 2,039,055 | Bonanno | Apr. 28, 1936 |
| 2,098,124 | Yancey | Nov. 2, 1937 |
| 2,114,720 | McKeige | Apr. 19, 1938 |
| 2,272,280 | Stoltz | Feb. 10, 1942 |